United States Patent
Staples

(10) Patent No.: US 7,592,916 B2
(45) Date of Patent: Sep. 22, 2009

(54) SMART SHIPPING AND STORAGE CONTAINER

(75) Inventor: Peter Ethan Staples, Los Angeles, CA (US)

(73) Assignee: Blue Clover Design, LLC, Los Angeles, CA (US)

( * ) Notice: Subject to any disclaimer, the term of this patent is extended or adjusted under 35 U.S.C. 154(b) by 350 days.

(21) Appl. No.: 11/560,241

(22) Filed: Nov. 15, 2006

(65) Prior Publication Data
US 2007/0124020 A1    May 31, 2007

Related U.S. Application Data

(60) Provisional application No. 60/737,273, filed on Nov. 16, 2005.

(51) Int. Cl.
*G08B 13/14* (2006.01)

(52) U.S. Cl. .............. 340/572.1; 340/539.13; 340/988; 700/229; 701/35; 705/22

(58) Field of Classification Search .......... 340/572.1, 340/988, 539.13, 938, 545.6; 700/229; 705/22; 701/35; 220/6, 4 F; 414/803
See application file for complete search history.

(56) References Cited

U.S. PATENT DOCUMENTS

| | | | |
|---|---|---|---|
| 7,135,976 B2 * | 11/2006 | Neff et al. ................ 340/572.1 |
| 7,339,469 B2 * | 3/2008 | Braun ................... 340/539.13 |
| 7,391,338 B2 * | 6/2008 | Eren et al. ............... 340/686.1 |
| 7,427,918 B2 * | 9/2008 | Fano ........................ 340/541 |
| 2002/0061758 A1 * | 5/2002 | Zarlengo et al. ............ 455/517 |
| 2003/0227382 A1 * | 12/2003 | Breed ................... 340/539.13 |
| 2004/0041706 A1 * | 3/2004 | Stratmoen et al. ...... 340/539.26 |
| 2005/0005683 A1 * | 1/2005 | Wolford et al. .............. 73/49.2 |
| 2005/0130652 A1 * | 6/2005 | O'Toole et al. .......... 455/432.2 |
| 2005/0232747 A1 * | 10/2005 | Brackmann et al. ......... 414/803 |

* cited by examiner

*Primary Examiner*—Brent Swarthout
(74) *Attorney, Agent, or Firm*—Jeffrey Schox

(57) ABSTRACT

The system of the preferred embodiment includes a container that functions to hold objects for shipping and storage; a sensor system coupled to the container that functions to detect the state of the container and an area surrounding the container; an output element that functions to display the detected information; a power supply that functions to collect, convert, store, and supply energy to the elements of the system; and a processor that functions to collect and store detected information from the sensors in order to connect the power supply to the elements of the system and to supply power to these elements on an as-needed basis to conserve energy.

17 Claims, 2 Drawing Sheets

SMART SHIPPING AND STORAGE CONTAINER

CROSS-REFERENCE TO RELATED APPLICATIONS

This application claims the benefit of US Provisional Application No. 60/737,273, filed 16 Nov. 2005 and entitled "Smart Shipping and Storage Container," which is incorporated in its entirety by this reference.

TECHNICAL FIELD

This invention relates generally to the shipping container field, and more specifically to a smart shipping and storage container that can detect its state and the state of the area around it.

BACKGROUND

Users of conventional shipping and storage containers do not have a way to monitor individual containers while they are being shipped and stored. They generally do not have any way of monitoring the location of the container; the movement of the container from a first location to a second location; the loading of the container on or off of shipping vehicles; the orientation of the container; if the container has been moved, bumped, or jostled; if the container is opened or closed; etc. Thus, there is a need in the shipping container field for a smart shipping and storage container that can detect its state and the state of the area around it. This invention provides such a new and useful smart shipping and storage container system.

DESCRIPTION OF THE PREFERRED EMBODIMENTS

The following description of the preferred embodiments of the invention is not intended to limit the invention to these preferred embodiments, but rather to enable any person skilled in the art of shipping containers to make and use this invention.

Figure 1:
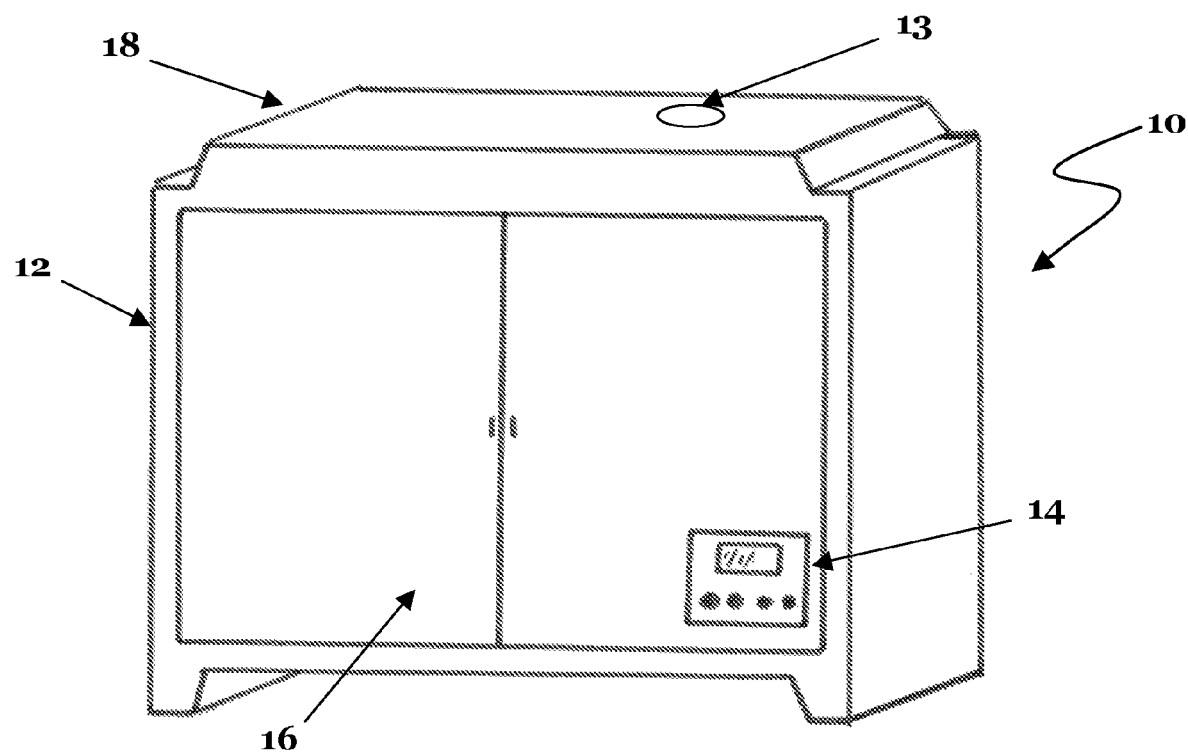
FIGS. 1, 2, and 3 are schematic drawings of the first, second, and third variations of the system of the first preferred embodiment of the invention.
Figure 2:
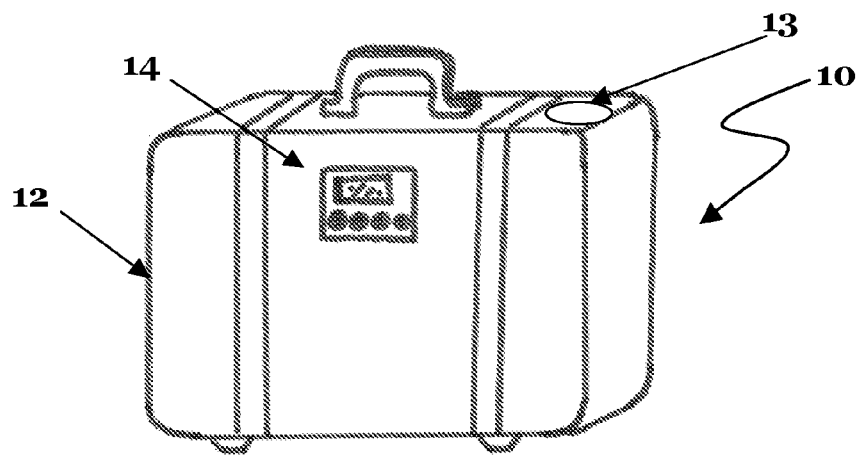
Figure 3:
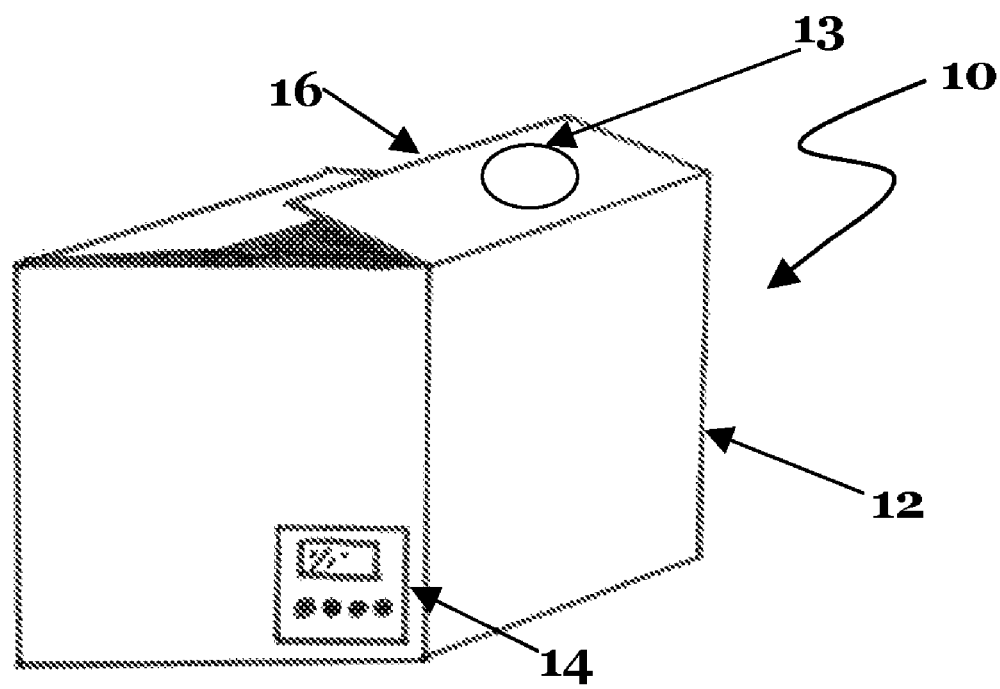

As shown in FIGS. 1, 2, and 3, the system 10 of the preferred embodiment includes a container 12 that functions to hold objects for shipping and storage; a sensor system 13 coupled to the container 12 that functions to detect the state of the container 12 and an area surrounding the container 12; an output element 14 that functions to display the detected information; a power supply that functions to collect, convert, store, and supply energy to the elements of the system 10; and a processor that functions to collect and store detected information from the sensors. The system 10 of the preferred embodiment has been specifically designed to collect, store, and display the detected information on the state of the container 12 and an area surrounding the container 12. The system 10 of the preferred embodiment has been further designed to collect, convert, store, and conserve energy, in order to power the elements of the system 10. The system 10, however, may be used in any suitable environment and for any suitable purpose.

As shown in FIGS. 1, 2, and 3, the container 12 functions to hold objects for shipping and storage. The container 12 may function to be foldable or collapsible, which will allow the container 12 to be easily stored and/or transported when not in use. Additionally, the container 12 may function to be stacked with other containers. Preferably, the container 12 has a geometry 18 that facilitates the stacking of several containers. The geometry 18 preferably includes a raised segment on the top portion of the container 12 and a corresponding indented segment on the bottom portion of the container 12, such that the bottom portion of a second container 12 will fit over the raised segment on the top portion of the first container 12. Additionally, the indented segment on the bottom portion of the first container 12 will fit over a raised segment on the top portion of a third container 12. The geometry 18 may alternatively be any suitable geometry to facilitate the stacking or fitting together of several containers.

In a first variation, as shown in FIG. 1, the container is a freight-shipping container. The container 12 in this variation is preferably made of metal such as steel, but may be alternatively made out of any suitable material. The container 12 has doors 16, which open and close, through which the objects to be contained may be inserted. In a second variation, as shown in FIG. 2, the container 12 is a personal shipping device such as a suitcase, briefcase, laptop case, or any other suitable personal shipping device. The container 12 in this variation may be made out of leather, canvas, or any other suitable material. In a third variation, as shown in FIG. 3, the container 12 is a standard shipping container or carton. In this variation, the container 12 may be made of cardboard, plastic, or any other suitable lightweight material. The container 12 has flaps or doors 16 through which the objects to be contained may be inserted. The container 12, like the container 12 of the first variation, may be further function to be collapsible, which will allow the container 12 to be easily stored and/or transported when not in use. In a fourth variation, the container 12 is a garbage container adapted to hold garbage, refuse, recyclable materials, or any other suitable material. The garbage container in this variation is preferably a standard garbage container, but may alternatively be any suitable container to hold garbage. The container 12 in this variation is preferably made out of plastic or metal, but may alternatively be made out of any other suitable material. In a fifth variation, the container 12 is a pallet. The container 12 in this variation is preferably a standard flat transport pallet adapted to be lifted by a forklift and to hold objects by securing them to the pallet with straps, plastic film, or by any other suitable means. The pallet is preferably made of wood, plastic, metal, recycled material, or any other suitable material. In alternative variations, the system 10 may include any suitable combination or permutation of the above variations of the container 12, doors 16, and geometry 18 to enclose objects for shipping and storing, stacking multiple containers 12, and transporting containers 12 while not in use.

The sensor system 13 of the preferred embodiment functions to determine the beginning and ending of the use of the container for the particular contents or trip, to detect the state of the container 12 and an area surrounding the container 12, and to index detected events by time and/or location. The sensor system 13 preferably includes three separate devices for these three separate functions, but may include any suitable combination or permutation of the below sensors to accomplish these functions.

To determine the beginning and ending of the use of the container for the particular contents or trip, the sensor system 13 includes, in a first variation, a weight sensor. The weight sensor may be a pressure sensor, a load sensor, a strain gauge or alternatively any other suitable sensor to detect the weight of the container or weight of objects placed in or on the container. In this variation, the sensor may be mounted on the container 12 in any suitable location to detect weight. The sensor may be on the bottom portion of the container to determine if the container is empty or full. If the container is full, it can detect the weight of the objects placed in the container. This feature would be useful while packing under weight limitations. For example, passenger airlines have weight limits on luggage; the sensor could alert the user when they have packed the container 12 over the allowable limit.

In a second variation, the sensor system 13 includes a switch to determine the beginning and ending of the use of the container for the particular contents or trip. The switch may be a physical switch activated by the user of the container, a biometric switch that authenticates the user, a physical switch incorporated into the doors or flaps of the container to be automatically activated upon the opening and/or closing of the doors or flaps of the container, a physical switch incorporated into the structure the container to be automatically activated upon the collapsing and/or expanding of the container, a RFID switch that is automatically activated by the presence of a certain magnetic field, or any other suitable switch. In a third variation, the sensor system 13 may incorporate any suitable device or method to determine the beginning and ending of the use of the container.

To detect the state of the container 12 and an area surrounding the container 12, the sensor system 13, in a first variation, includes a motion detector. The motion detector is preferably an accelerometer that can detect the acceleration of the container 12. The motion detector may alternatively be a passive infrared (PIR) sensor that can determine the state of the container 12 and an area surrounding the container 12 by detecting changes in the infrared energy (or radiant heat) emitted by any warm object. As a variation, the motion detector may emit microwave energy or ultrasonic sound waves to detect motion. The motion detector may alternatively include a piezoelectric sensor, an IR or light beam coupled with a photosensor, or it may be any other suitable device or method such as a vibration sensor, a speedometer, a tilt sensor, Hall effect sensor, or any other suitable device that is able to detect the state of the container 12 and an area surrounding the container 12. Examples of states that the sensors in this variation might detect include the following and any combination or permutation of the following: the movement of the container from a first location to a second location such as the loading of the container 12 on or off of vehicles, planes, ships, trains or any other suitable vehicle or area; the orientation of the container such as detecting if the container 12 has been moved, bumped, jostled, or if the container is correctly oriented ("right side up"); or if the container is folded or unfolded.

In a second variation, the sensor system 13 includes a weight sensor to detect the state of the container 12 and an area surrounding the container 12. In this variation, the sensor may be a pressure sensor, a load sensor, a strain gauge or alternatively any other suitable sensor to detect the weight of the container or weight of objects placed in or on the container. In this variation, the sensor may be mounted on the top portion of the container 12 to detect how much weight the container 12 is bearing. The feature would help prevent excessive weight from being stacked on containers 12 containing fragile items. In a third variation, the sensor system 13 includes an ambient condition sensor to detect the state of the container 12 and an area surrounding the container 12. The ambient condition sensor may be a rain sensor, a carbon monoxide sensor, a dust sensor, a water or water level sensor, a humidity sensor, a temperature sensor, a light sensor or photo sensor, a methane sensor, an *e. coli* sensor, a smoke detector, a wind sensor, a barometer, a clock, or any other suitable device to detect any suitable ambient condition. This sensor may be particularly important if the container is shipping live plants or animals, food, beverages or any other sensitive object. In a fourth variation, the sensor system 13 includes a recording device to detect the state of the container 12 and an area surrounding the container 12. The recording device is preferably one of several variations. In a first variation, the recording device includes a camera that functions to record video or still frame information. The camera is preferably a conventional camera, but may be any suitable device able to record images using visual light waves. In a second variation, the recording device includes a night-vision camera that functions to record video or still frame information using infrared light waves. The camera is preferably a conventional night-vision camera, but may be any suitable device able to record images using infrared light waves. In a third variation, the recording device further includes a night-vision camera, a sensor, and an IR illuminator. The sensor functions to detect the darkness or brightness of an area. The sensor is preferably a photo-resistor, but may alternatively be any suitable device or method to detect if an area is bright or dark. The sensor further functions to control a switch that sets the camera in normal mode or in night-vision mode. The IR illuminator functions to emit infrared radiation. The IR Illuminator is preferably one or more High Efficiency IR LEDs but may alternatively be any suitable IR emitting element, such as a Krypton Bulb, which is a Hot Filament IR Light. In normal mode, the recording device records the images using visual light waves while the IR illuminator is switched off or the recording device 16 filters the IR light. In night-vision mode, the recording device 16 records the image using the infrared light waves emitted by the IR illuminator. In a fourth variation, the recording device includes a microphone that functions to detect and/or record audio information. The microphone is preferably a conventional microphone, but may be any suitable device able to record sound. In alternative variations, the recording device may include any suitable combination or permutation of the above recording devices.

To index detected events by time and/or location, the sensor system 13, in a first variation, includes a Global Positioning System (GPS) receiver. This sensor may function to check time and location information and index the other information collected on the container. This sensor may provide a master clock for synchronizing the elements of the system 10. The sensor system 13 may alternatively include any other suitable device to perform a location and/or time function, such as an elapsed time device.

As shown in FIGS. 1, 2, 3, and 4, the output element 14 of the preferred embodiment functions to display the detected and recorded information. Information may be displayed real-time and/or in a split screen format. Information may alternatively be displayed in a report format. With the report format, at the end of a designated length of time, a report of the detected state of the container 12 and an area surrounding the container 12 and any other suitable information is compiled. Preferably, information may be accessed and viewed at any time.

Figure 4:
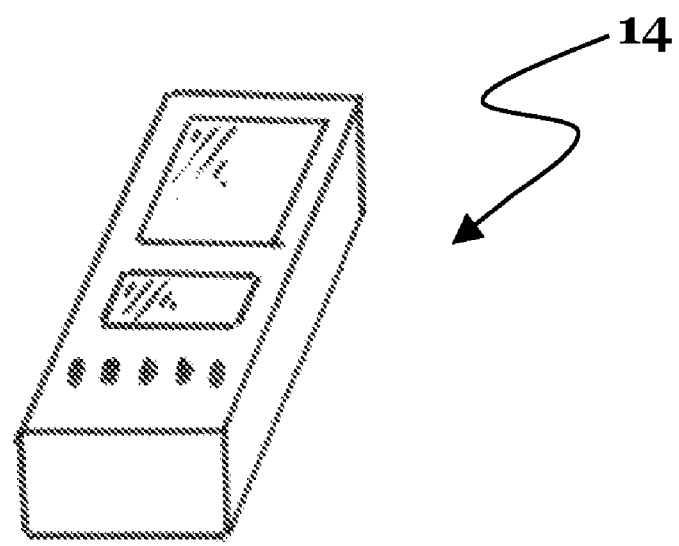
FIG. 4 is a schematic drawing of the second variation of the display element of the system.

The output element 14 of the preferred embodiment is preferably one of several variations but may consist of any suitable device or method by which to display information as described above. In a first variation, as shown in FIGS. 1, 2, and 3, the output element 14 is a physical display unit mounted on the container 12. The display unit may include a screen, controls, speakers, or any other suitable devices or methods to display information or to accept user inputs. In a second variation, the output element is a physical display unit. The output element 14 of this variation may be a stand alone display unit such as a handheld unit, as shown in FIG. 4, or may alternatively be in the form of a wristwatch to be worn by the user, or a PDA to be held by the user. In a third variation, the output element 14 is an Internet display. In this variation, the output element 14 is a webpage, an Internet email, or any other suitable device or method to display information. In this variation, the output element 14 may send an alert email at the occurrence of designated events. In this variation, the user can access a web page to gather pertinent information on their system 10. In a fourth variation, the output element 14 is an audio message, a pager code, or a SMS message. In this variation, the system 10 may display the recorded information in the form of an audio alert message to a phone, answering machine, pager or any other suitable device. The alert message may be sent to the owner or user of the system 10 or to the shipping company or airline.

The power supply of the preferred embodiment functions to collect, convert, store, and supply energy to the elements of the system 10 requiring power. Preferably, the power supply is rechargeable, highly efficient, and will power the elements of system 10 for the entire life of the system 10. In a first variation, the power supply may be piezoelectric elements or any other suitable elements to collect and convert energy from several different sources of energy generated by applying a force to the container such as the force of putting the container down, the force of opening or closing the door 16, tilting or moving the container 12, folding or unfolding the container 12, or by any other suitable means. Alternatively, the power supply may also be rechargeable solar panels or fuel cells, or may be able to recharge from another system 10 when the containers 12 are stacked.

The processor of the preferred embodiment, which is coupled to the sensors, the output element 14, and the power supply, functions to collect and store the detected information from the sensors, to connect the power supply to the elements of the system 10, and to supply power to these elements on an as-needed basis to conserve energy. The processor is preferably a conventional processor but may alternatively be any suitable device to perform the desired functions.

The processor functions to connect the elements of the system 10 to adjacent systems. To accomplish this, the processor may be paired with a sensor that detects compatible devices. Each system 10 may include a known sequence to send to its neighbors, identify itself by, and establish a mesh network. The elements and systems 10 may be connected through a system of wires and/or by means of a wireless device. The wireless device may function to connect any suitable combination of the elements of system 10. The wireless device may also function to connect the system 10 to another adjacent system 10, or may function to connect the system 10 to a larger network, such as a ZigBee network, a Bluetooth network, or an Internet-protocol based network.

The processor of the preferred embodiments further includes a memory device or storage device that functions to collect and store the detected information from the sensors. The storage device is preferably a conventional memory chip, such as RAM, a hard drive, or a flash drive, but may alternatively be any suitable device able to store information. The processor may, for example, record time and sensed information upon the occurrence of significant events, such as the movement or re-orientation of the container sensed by motion detector, the placement of other objects on the container sensed by the weight sensor, the placement of the container in a chilled/heated or dry/humid environment sensed by the ambient sensor, and the opening/closing of the container. This information is preferably indexed by both time and location. In this manner, the processor records a "trip log" for the container. The processor may, of course, store any suitable information recorded by the sensors of the container and may index the information by any suitable parameter. The processor may store and compile information until a predetermined event such as the folding or unfolding of the container, the opening or closing of the doors 16, the emptying or filling of the container 12, or any other suitable event. Upon occurrence of such an event, the processor may reset and erase the storage device to prepare for a new set of information.

The processor of the preferred embodiments further functions to transmit the "trip log" information that has been stored in the storage device to be displayed by the output element 14. Armed with accurate "trip log" information, the user or owner of the container can easily resolve issues of damage or theft with facts instead of speculation. The processor may be connected to the output element 14 through a system of wires (including phone lines), or by means of a wireless device. The wireless device may function to connect the processor to a local output element 14, or may function to connect the processor to an output element 14 on a larger network, such as a ZigBee network, a Bluetooth network, an Internet-protocol based network, or a cellular network.

The processor of the preferred embodiments further functions to conserve energy. To accomplish this function, the processor may be paired with a power level detection device. This information will allow the processor to utilize power accordingly. Preferably, the processor will only supply power to the sensors and to the output element 14 when the sensors have detected predetermined information such as motion, tilt, weight, or any other suitable event. If the system 10 has detected a predetermined state such as being idle for a predetermined length of time, the processor will preferably cut power to the elements of system 10. The processor may alternatively run on an algorithm. The processor on this algorithm will set sensing times that will be initially be frequent during a predetermined event, such as jostling. The sensing frequency will decay over time from the start time, initial event, or after the container 12 has been idle for a predetermined length of time. The sensing frequency will decay until the sensing stops completely and the power has been cut from the sensors. The sensors will remain off until a predetermined event triggers the processor to begin the sensing again. The processor may further conserve energy by networking multiple systems 10. When systems 10 are stacked or are placed near one another, the processors may connect the systems to share power and sensing capabilities. Once the systems 10 are networked, the number of systems that are activated may be minimized. The systems 10 can alternate being activated or the system with the most power can be turned on, saving the power of the other systems.

The system 10 of the preferred embodiment may also include elements that may be remotely controlled. These elements may preferably include doors 16 or any other suitable element. For example, if the system 10 displays information that a door 16 is incorrectly open, the user may remotely control the door 16 and close it. As another example, if the system 10 displays information that the temperature is too low, the user may remotely activate a heating element to heat the container 12. Alternatively, the information displayed may be of any other suitable event and the remotely controlled element may alternatively be any other suitable element.

Although omitted for conciseness, the preferred embodiments include every combination and permutation of the various containers 12, sensor systems 13, output elements 14, power supplies, and processors.

As a person skilled in the art of shipping containers will recognize from the previous detailed description and from the figures, modifications and changes can be made to the preferred embodiments of the invention without departing from the scope of this invention.

I claim:

1. A shipping and storage container system comprising:
    a container adapted to hold objects for shipping and storage and adapted to be collapsible;
    a sensor system coupled to the container and adapted to detect a state of the container and to index detected events by at least one of time and location, wherein the sensor system includes a switch adapted to be automatically activated upon collapsing or expanding of the container;
    an output element adapted to display information;
    a power supply adapted to store and supply energy; and
    a processor coupled to the first sensor, the output element, and the power supply, wherein the processor is coupled to the switch and adapted to index the beginning and ending of the use of the container based on the activation of the switch.

2. The shipping and storage container system of claim 1 wherein the container is at least one of a freight-shipping container, a personal shipping device, a standard shipping container, a garbage container, and a pallet.

3. The shipping and storage container system of claim 1 wherein the sensor system includes a motion detector adapted to be automatically activated upon movement of the container, wherein the processor is coupled to the motion detector and adapted to index the use of the container based on the activation of the motion detector.

4. The shipping and storage container system of claim 1 wherein the container includes a door, and wherein the switch is coupled to the door and adapted to be automatically activated upon movement of the door, wherein the processor is coupled to the switch and adapted to index the beginning and ending of the use of the container based on the activation of the switch.

5. The shipping and storage container system of claim 1 wherein the sensor system is adapted to detect the orientation of the container.

6. A shipping and storage container system comprising:
    a container adapted to hold objects for shipping and storage;
    a sensor system coupled to the container and adapted to detect a state of the container and to index detected events by at least one of time and location; wherein the sensor system includes a weight sensor to detect how much weight the container is bearing;
    an output element adapted to display information;
    a power supply adapted to store and supply energy; and
    a processor coupled to the first sensor, the output element, and the power supply, wherein the processor is further adapted to control the weight sensor in the following modes:
        zero mode—wherein the processor takes into account the weight of the container when empty;
        container mode—wherein the processor sets the weight sensor to detect weight added to the container; and
        stacking mode—wherein the processor sets the weight sensor to detect weight of other containers on the container.

7. The shipping and storage container system of claim 1 wherein the sensor system includes an ambient condition sensor selected from the group consisting of a rain sensor, a carbon monoxide sensor, a dust sensor, a water sensor, a water level sensor, a humidity sensor, a temperature sensor, a light sensor, a photo sensor, a methane sensor, an *e. coli* sensor, a smoke detector, a wind sensor, and a barometer.

8. The shipping and storage container system of claim 1 wherein the sensor system includes a Global Positioning System receiver adapted to detect a current location of the container, wherein sensor system is adapted to index detected events by location.

9. The shipping and storage container system of claim 8 wherein the Global Positioning System receiver is further adapted to detect a current time, wherein the sensor system is adapted to index detected events by time.

10. The shipping and storage container system of claim 1 further comprising a recording device including at least one of a camera adapted to record at least one still frame and a microphone adapted to record audio information.

11. The shipping and storage container system of claim 1 wherein the output element is a physical display unit integrated with the container.

12. The shipping and storage container system of claim 1 wherein the output element is a stand alone display unit.

13. The shipping and storage container system of claim 1 wherein the output element is connected to the processor via a computer network.

14. The shipping and storage container system of claim 1 wherein the power supply is adapted to capture energy from a power supply of a second shipping and storage container system.

15. The shipping and storage container system of claim 1 wherein the processor is adapted to connect multiple shipping and storage container systems via a network.

16. The shipping and storage container system of claim 1 wherein the processor includes a storage device that is adapted to store information, wherein the processor is further adapted to control the storage device in the following modes:
    storage mode—wherein the processor activates the storage device to store the recorded information when the first sensor detects a predetermined state, wherein the predetermined state is selected from the group consisting of movement of the container system, re-orientation of the container system, placement of other objects on the container system, change in the ambient temperature, change in the ambient humidity, opening of the container, and closing of the container; and
    reset mode—wherein the processor clears the stored information from the storage device.

17. The shipping and storage container system of claim 1 wherein the first sensor is a power level sensor that is adapted to detect the amount of power in the power supply; wherein the processor is further adapted to control the power supply in the following modes:
    power on mode—wherein the processor activates the power supply to supply power to the elements of the shipping and storage container system when the first sensor detects a predetermined state; and
    power off mode—wherein the processor deactivates the power supply when the first sensor detects a second predetermined state.

* * * * *